Dec. 17, 1940.  C. M. STITT ET AL  2,225,187
WIRE HANDLING MACHINE
Filed Jan. 23, 1939  9 Sheets-Sheet 1
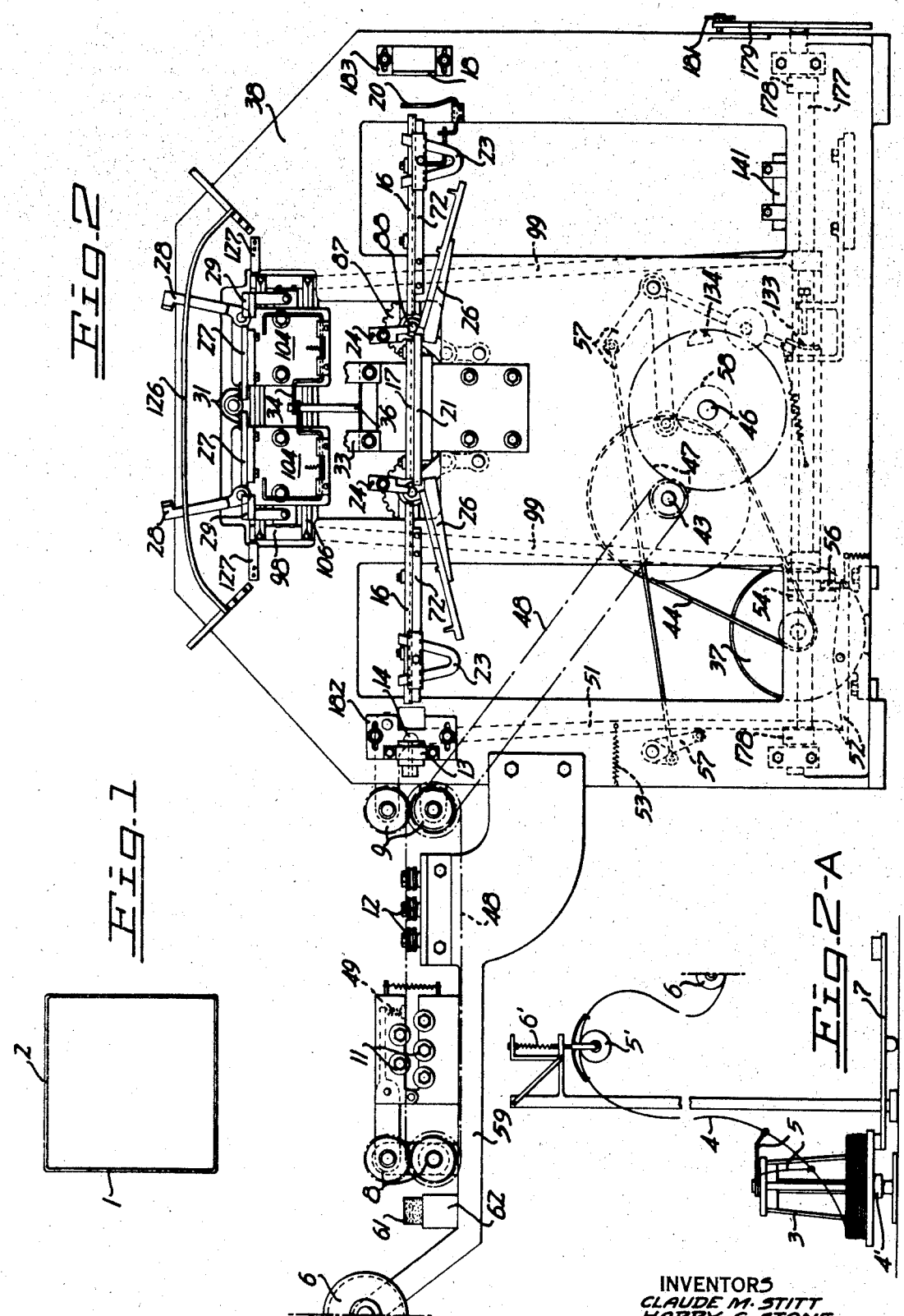
INVENTORS
CLAUDE M. STITT
HARRY C. STONE
FLOYD B. STONE
BY Charles S. Evans
THEIR ATTORNEY Dec. 17, 1940.   C. M. STITT ET AL   2,225,187
WIRE HANDLING MACHINE
Filed Jan. 23, 1939   9 Sheets-Sheet 2
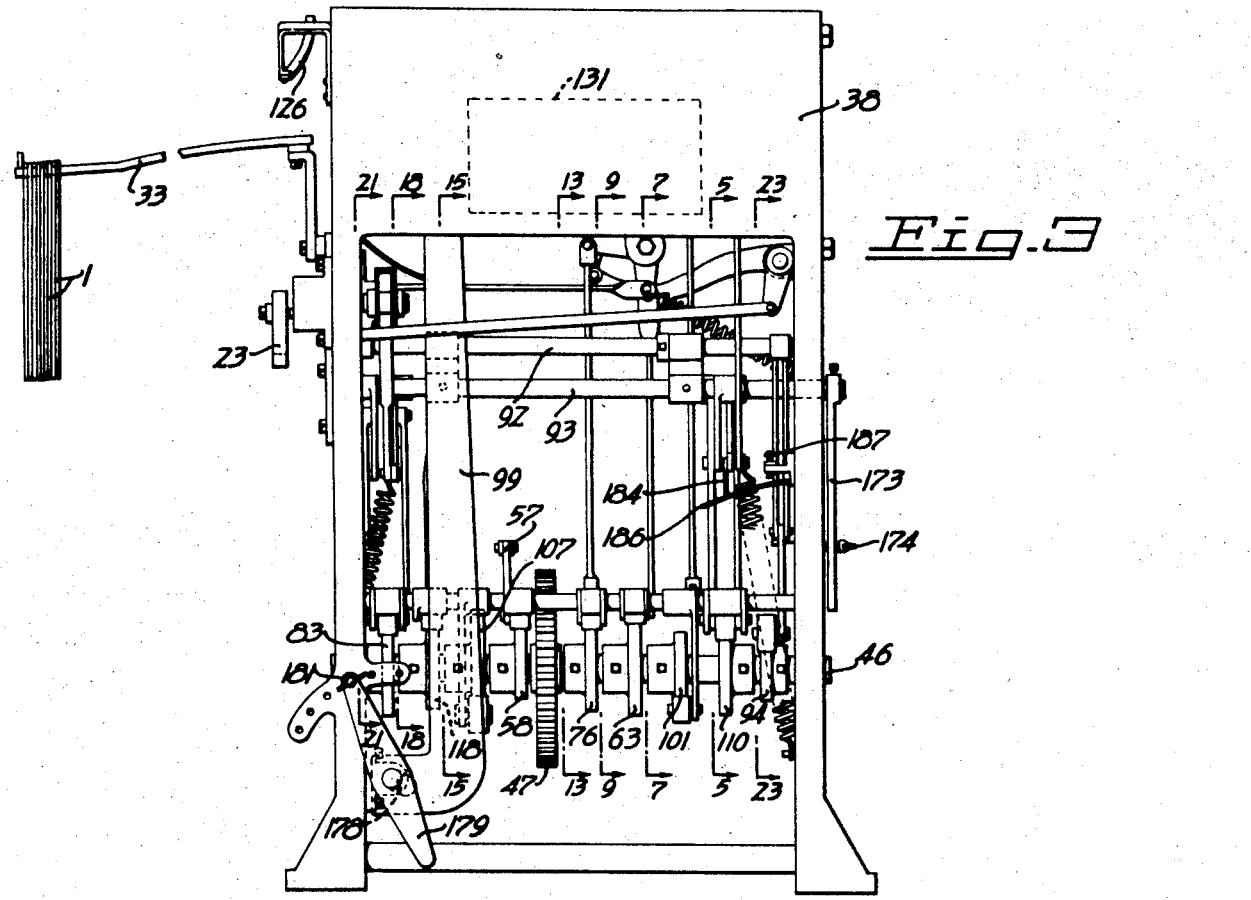
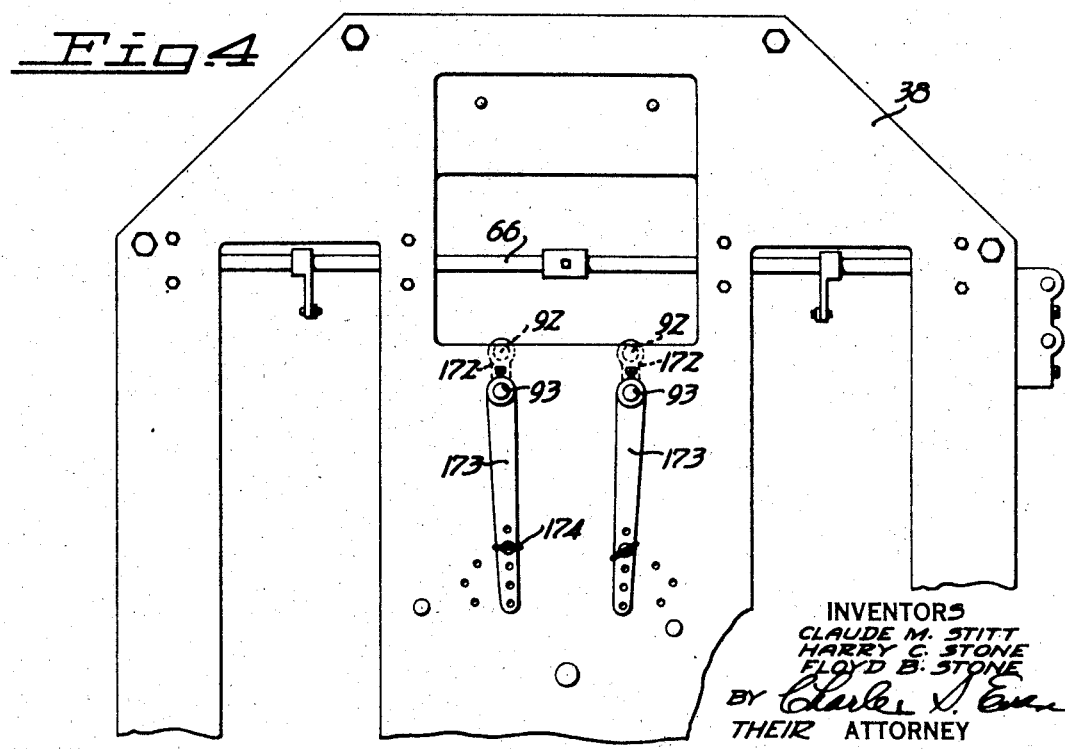
INVENTORS
CLAUDE M. STITT
HARRY C. STONE
FLOYD B. STONE
BY
THEIR ATTORNEY Dec. 17, 1940. C. M. STITT ET AL 2,225,187
WIRE HANDLING MACHINE
Filed Jan. 23, 1939 9 Sheets-Sheet 3

INVENTORS
CLAUDE M. STITT
HARRY C. STONE
FLOYD B. STONE
BY
THEIR ATTORNEY

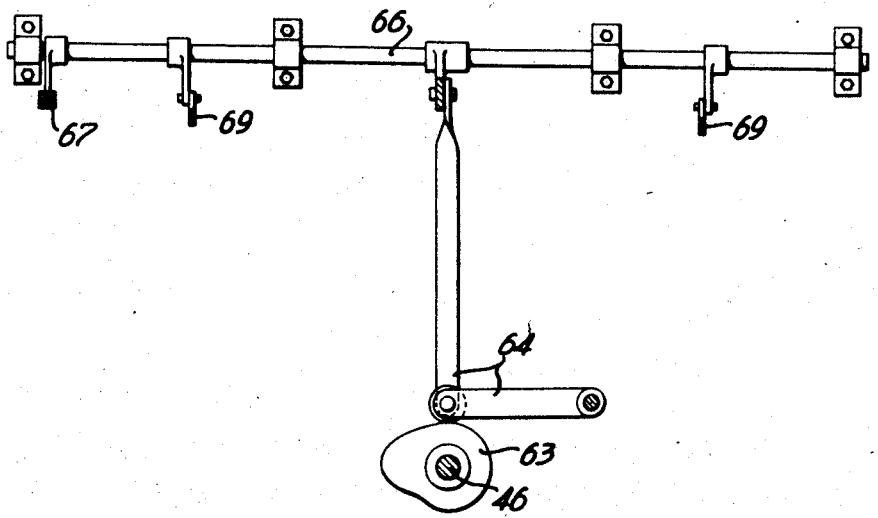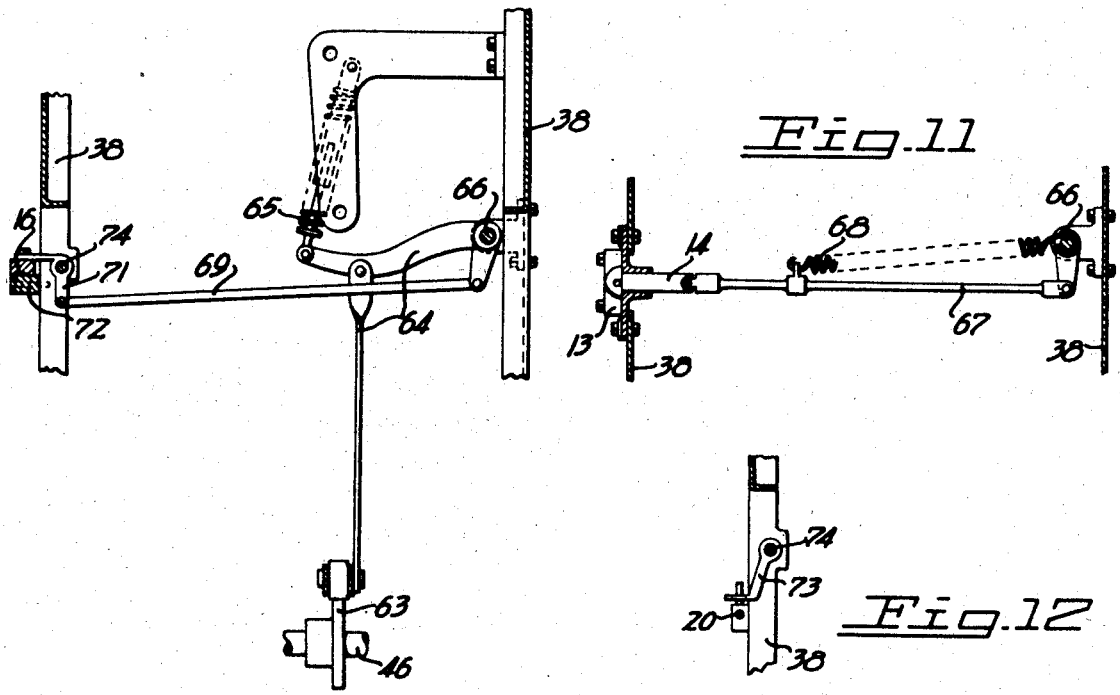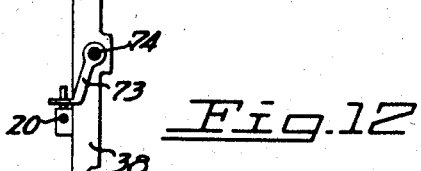

Dec. 17, 1940. C. M. STITT ET AL 2,225,187
WIRE HANDLING MACHINE
Filed Jan. 23, 1939 9 Sheets-Sheet 5

INVENTORS
CLAUDE M. STITT
HARRY C. STONE
FLOYD B. STONE
BY
THEIR ATTORNEY

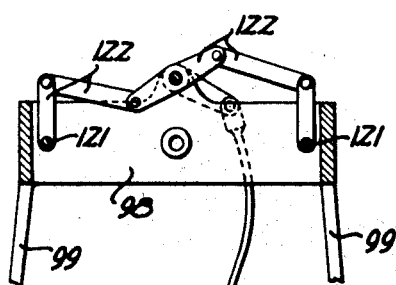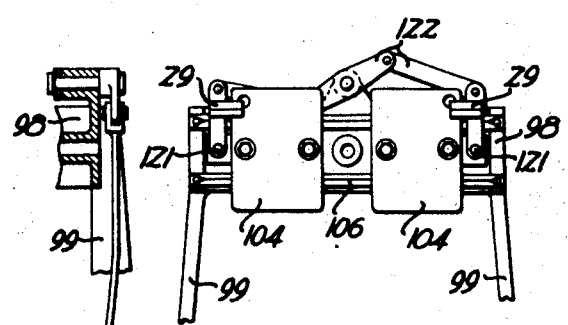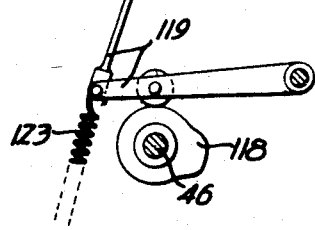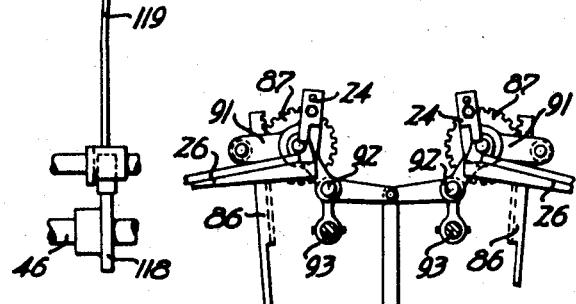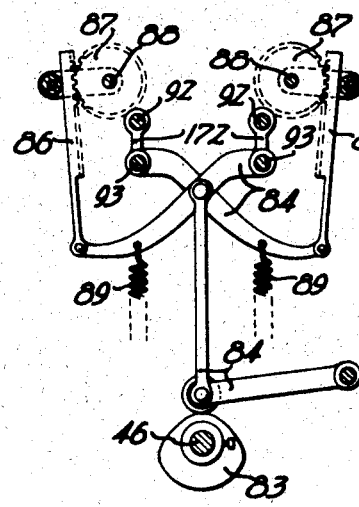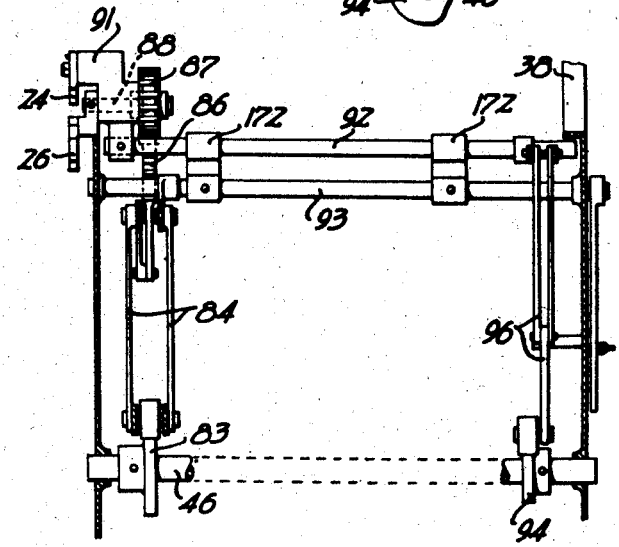

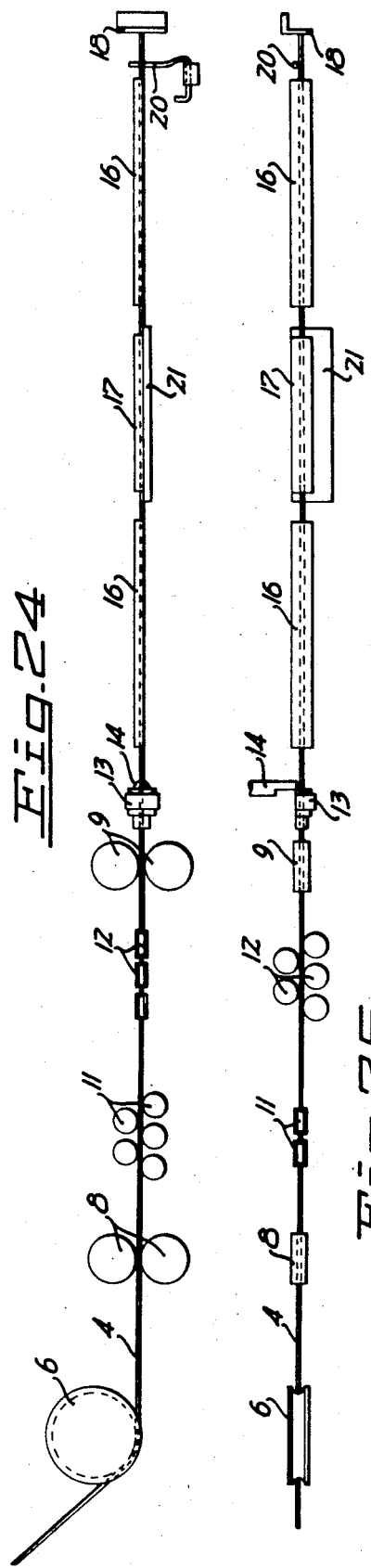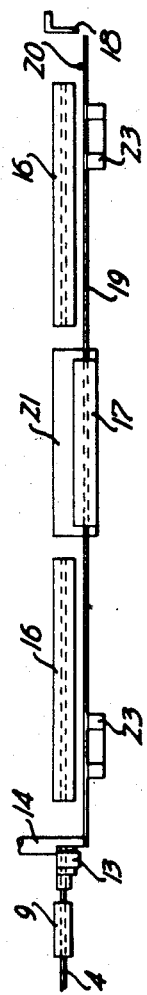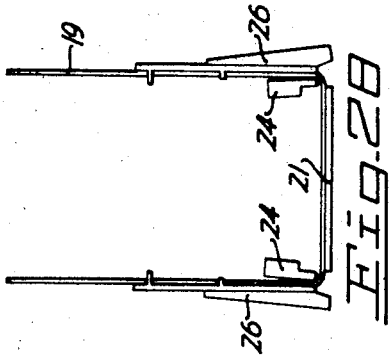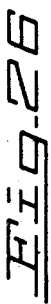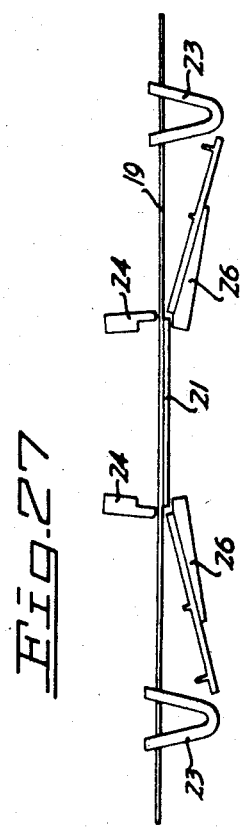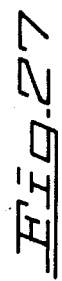
INVENTORS
CLAUDE M. STITT
HARRY C. STONE
FLOYD B. STONE
BY Charles J. ...
THEIR ATTORNEY Dec. 17, 1940.         C. M. STITT ET AL         2,225,187
                    WIRE HANDLING MACHINE
              Filed Jan. 23, 1939      9 Sheets-Sheet 3

INVENTORS
CLAUDE M. STITT
HARRY C. STONE
FLOYD B. STONE
BY
THEIR ATTORNEY

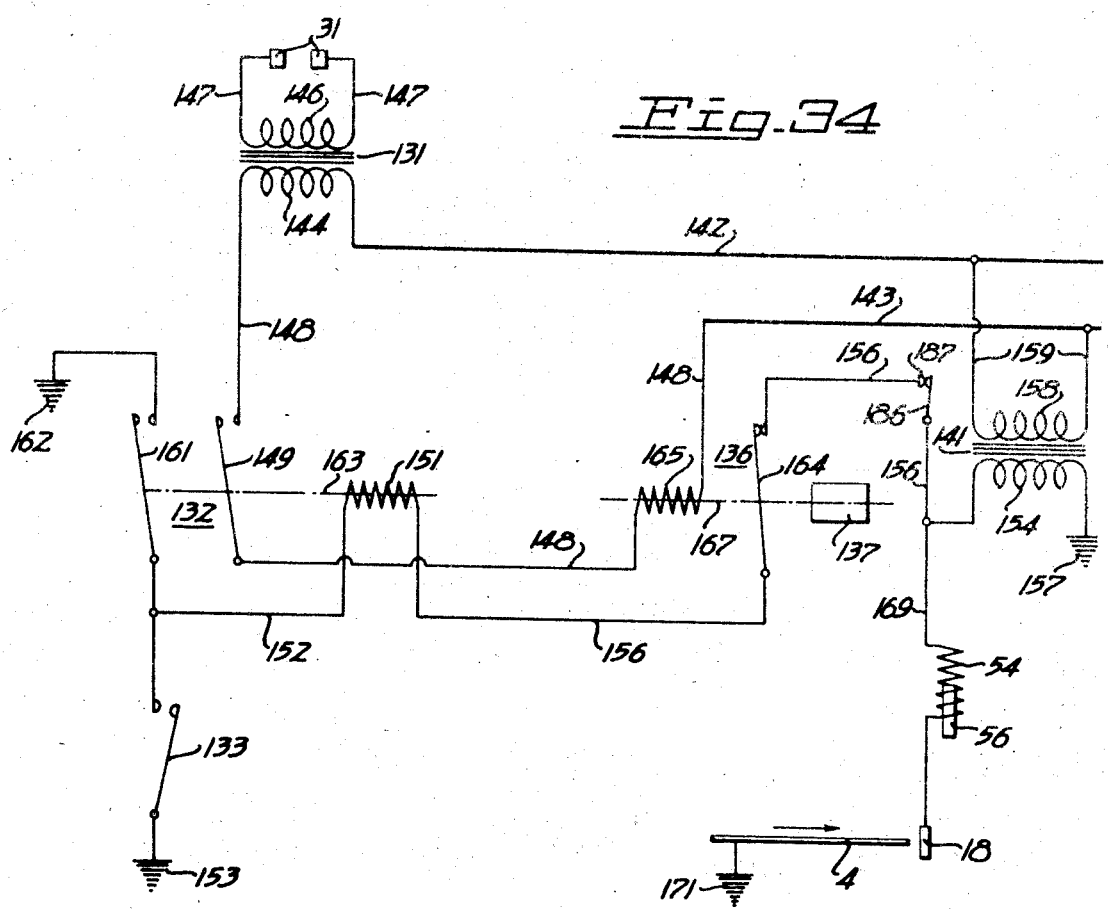
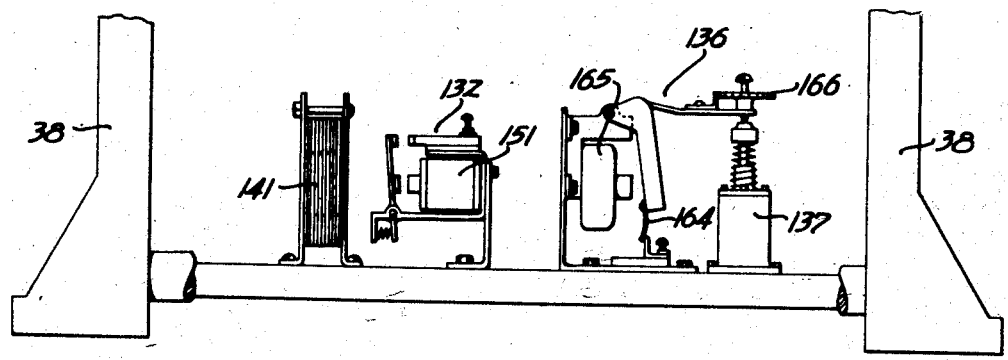

Patented Dec. 17, 1940

2,225,187

UNITED STATES PATENT OFFICE

2,225,187

WIRE HANDLING MACHINE

Claude M. Stitt, Antioch, Harry C. Stone, Burlingame, and Floyd B. Stone, San Francisco, Calif., assignors to Fibreboard Products Inc., San Francisco, Calif., a corporation of Delaware Application January 23, 1939, Serial No. 252,254

13 Claims. (Cl. 140—71)

Our invention relates to a machine for making wire articles; and more particularly to a machine for forming wire loops, such as the wire reinforcing loops used in boxes or baskets.

It is among the objects of our invention to provide a machine of the character described which forms wire loops automatically and in rapid succession.

Another object is to provide improved means for bending the wire to form the loop.

A further object is to provide means for automatically welding the ends of the wire together after the loop is formed.

A still further object is to provide adjustments for varying the size of loop being formed.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claims.

Referring to the drawings:

Figure 1 is a plan view of a wire loop formed by our machine.

Figure 2 is a front elevational view of the machine embodying our invention; and Figure 2a is a continuation of Figure 2 from the left end of the machine showing the apparatus for supplying wire to the machine on a reduced scale.

Figure 3 is a side elevational view of the machine.

Figure 4 is a fragmentary rear elevational view of the machine, showing two of the adjusting levers.

Figure 9 is a longitudinal sectional view taken in a plane indicated by line 9—9 of Figure 3, showing the cam and linkage for lifting the wire holding side bars; and Figure 10 is a transverse sectional view of the same.

Figure 11 is a transverse sectional view of the shear which is also actuated by the cam and linkage shown in Figure 9.

Figure 12 is a detail sectional view of a wire moving element.

Figure 18 is a longitudinal sectional view taken in a plane indicated by line 18—18 of Figure 3, showing the cam and linkage for turning the pressure elements at the upper sides of the loop; and Figure 19 is a transverse sectional view of the same.

Figure 20 is a fragmentary front elevational view of the head sections and pressure elements.

Figure 21 is a longitudinal sectional view taken in a plane indicated by line 21—21 of Figure 3, showing the cam and linkage for turning the lower pair of bending arms; and Figure 22 is a transverse sectional view of the same.

Figure 23 is a longitudinal sectional view taken in a plane indicated by line 23—23 of Figure 3, showing the cam and linkage for moving the loop straightening elements.

Figures 24 to 33 are diagrammatic views showing the wire and coacting elements during various stages of bending operation.

Figure 34 is a wiring diagram.

Figure 35 is a fragmentary side elevational view showing parts of the control apparatus.

Figure 5:
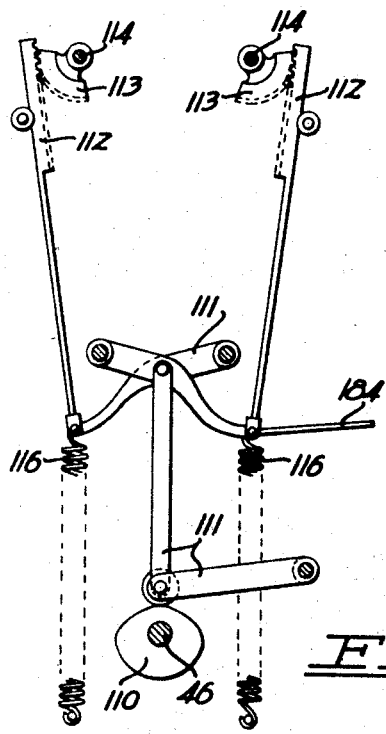
Figure 5 is a longitudinal sectional view taken in a plane indicated by line 5—5 of Figure 3, showing the cam and linkage for turning the upper pair of the wire bending arms.

In terms of broad inclusion, the wire handling machine of our invention comprises means for feeding wire into cutting position; means for cutting off a piece of wire of predetermined length; means for bending the wire into predetermined shape, such as a loop; and means for fastening the ends of the wire together. The fastening is preferably done by electrical means contacting the ends of the wire for welding the latter together.

In greater detail, and referring to the drawings, the machine embodying our invention is designed particularly for making wire loops of the type used as reinforcing members for fibreboard boxes and baskets. Figure 1 shows such a wire loop 1 of square shape having the ends of the wire joined by a weld 2 at the center of one of the sides of the loop. Before entering into a detailed description of our structure the path of the wire will be traced through the machine to identify the various parts of the mechanism which act on the wire.

*Handling of wire.*—As shown in Figure 2a a reel 3 is provided for holding a supply roll of wire 4 and is mounted on a vertical axle carrying a suitable thrust bearing 4' for supporting the reel. The wire peeled from the reel passes through eyes on the ends of a pair of arms 5, the lower of which is preferably of spring steel, both mounted to swivel together on the top of the reel axle; and the wire is then looped over a pulley 5' and directed downwardly under a guide wheel 6 on the end of the machine. Pulley 5' is mounted to swivel freely, and is supported from a spring 6'. The excess wire looped over pulley 5' is available for rapid movement into the machine by reason of the yieldable mounting of pulley 5', thereby eliminating sudden jerking of the wire from the reel. Pulley 5' tends to bounce up and down during the operation of the machine, and the vibrations thus set up in the wire by the pulley and the resilient arm 5 serve to loosen the convolutions on the reel and keep the wire free for peeling it off the reel. A suitable brake 7 is also provided for the reel and is adjusted to provide sufficient drag on the reel to prevent the latter from overrunning the wire being peeled off. Referring to the diagrammatic views in Figures 24 to 33, the wire 4 is directed along a straight path into the machine from a guide wheel 6, and is fed forwardly by two pairs of feed rolls 8 and 9 between which two sets of wire straightening rolls 11 and 12 are interposed. Feed rolls 8 and 9 are designed so that separation of one of the pairs stops forward movement of the wire. From feed rolls 9 the wire moves into cutting position through a cut-off head 13 having a shear bar 14 for severing the wire. A series of grooved hold down bars 16 and 17 are provided in the cutting position, under which the wire passes. The cutting of the wire is controlled by a stop 18 against which the leading end of the wire abuts, and means associated with the stop is provided for separating the feed rolls and simultaneously actuate shear bar 14 to cut off a piece of wire 19. Figure 24 shows in elevation the arrangement of the various parts when the wire is ready to be severed; and Figure 25 shows the same in a plan view.

As the wire is cut the end hold down bars 16 are lifted and center bar 17 slides sidewise to move the wire laterally to a bending position lying parallel to the cutting position. Shear bar 14 and a movable element 20 at the ends of the wire also assist in shifting it. Base plate 21 under center bar 17 projects outwardly enough to give support for the wire in both positions, and center bar 17 then lifts up and moves back to receive another wire in the cutting position. A pair of magnets 23 are also provided for attracting the wire piece into bending position and for holding it there. The plan views in Figures 25 and 26 show how wire piece 19 is shifted laterally from cutting to bending positions.

Figures 27 to 32 are elevations showing the wire in bending position, and illustrate the sequence of the bending operations. A pair of elements 24 are arranged above the wire and about which the wire may be bent as pivoted arms 26 turn up the side portions of the loop. Figure 28 shows the arrangement of the parts after arms 26 have turned up.

After the sides of the loop have been bent up, a reciprocating head carrying plates 27, bending arms 28 and pressure elements 29 moves out into the plane of the loop. Arms 28 then rotate down to bend the end portions of wire 19 inwardly against plates 27. At this time the ends of the wire are spaced but aligned for abutment. See Figure 30. Pressure elements 29 then move inwardly against the sides of the loop at the upper corners, and the side units of the head then move together to bring the ends of the wire into abutment, as shown in Figure 31. Elements 24 at the lower corners of the loop also rotate with a slight outward and downward turning motion to tension and thereby straighten the sides of the loop and produce sharp, right angle bends at the corners.

The abutting ends of the wire are suitably fastened together, preferably by electrical welding means having electrodes 31 on plates 27 for contacting the wire ends to weld the latter when moved into abutment.

In the meantime the lower bending arms 26 are rotated back out of the way, and corner elements 24 are turned back to free the lower end of the loop. When the weld is completed upper arms 28 and pressure elements 29 are rotated out, and the completed loop 1 is discharged onto a holder 33 by the action of central hold down bar 17 when bringing out a new piece of wire to bending position. The lower end of the loop is shoved off plate 21 by bar 17, and the upper end of the loop is kicked off plates 27 by an element 34 actuated by an arm 36 connected for movement with bar 17. The upper head then retracts to carry plates 27, arms 28 and pressure elements 29 back out of the way of the next loop being folded up.

The parts of the mechanism are so timed that while one loop is being formed in the bending position a new section of wire is fed into cutting position. Loops 1 are therefore formed automatically and in rapid succession; the only attention required of an operator being to replenish supply roll 3 and remove the completed loops from rack 33. Having identified the principal parts of our machine, the detailed structure comprises:

*Drive and feeding mechanism.*—Referring to Figures 2, 3 and 4 our machine is driven by a motor 37 mounted on the frame 38 and connected to a cross shaft 43 by a belt 44. A cam shaft 46 is also journaled transversely of the frame, and is connected to drive shaft 46 by gears 47. Lower feed rolls 8 and 9 of each pair are driven from shaft 43 by suitable chains 48, and the upper feed rolls are geared to the lower ones.

Upper feed roll 8 is spring pressed to give traction on the wire, but spring 49 is sufficiently light so that rolls 8 alone will not feed the wire without the help of rolls 9. Thus by separating rolls 9 the wire may be stopped. Upper roll 9 is mounted on a rocker arm having a depending portion 51 held by a catch bar 52 so that release of the latter allows spring 53 to separate the rolls. This release is controlled by a solenoid 54 acting on a plunger 56 connected with catch bar 52. Solenoid 54 is in turn hooked up with stop 18 and is energized when the leading end of an incoming wire abuts the stop, thereby separating the feed rolls. The rolls are brought together again to start feeding the wire by the action of a reset linkage 57 controlled by a cam 58 on shaft 46. This action is timed to start the feed after a cut off piece of wire has been shifted over into bending position.

Straightening rolls 11 and 12 are provided to take out kinks in the wire, and are mounted on frame arm 59 between suitable spring pressed blocks. A cleaning device is also preferably provided for removing rust and scale from the wire and comprises a felt pad 61 through which the wire passes; the felt being saturated with a suitable cleaning fluid from can 62.

*Wire cut off mechanism.*—After wire 4 has stopped in the cutting position shear bar 14 moves forward to cut it off. As shown in Figures 9 to 11, the shear is operated by a cam 63 on shaft 46 for lifting a linkage 64 to turn an upper shaft 66. A spring 65 in this linkage serves to hold the follower against the cam. A connecting rod 67 between shaft 66 and shear bar 14 operates to reciprocate the latter, and a spring 68 is arranged to retract the shear. At the instant shear bar 14 starts forward the side hold down bars 16 are lifted to clear the wire. This is accomplished by rods 69 connected between shaft 66 and bar lifting cranks 71, so that when rods 69 move forward bars 16 tip up to free the wire. Figure 10 shows the grooved character of hold down bar 16, providing a channel over base plate 72 when the bar is down, through which the wire is threaded in cutting position.

When shear 14 goes forward it acts to push out that end of the wire. At the same time, kickout element 20 operates to shove out the other end of the wire. Figure 12 shows this element actuated by a lever 73 fixed on the same pin 74 which carries the adjacent bar crank 71.

Figure 13:
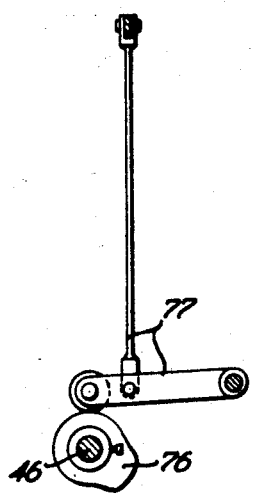
Figure 13 is a longitudinal sectional view taken in a plane indicated by line 13—13 of Figure 3, showing the cam and linkage for actuating the central wire holding bar.
Figure 14:
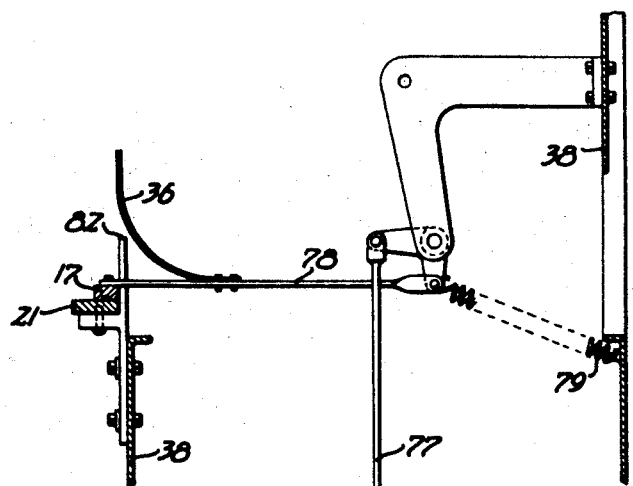
Figure 14 is a transverse sectional view of the same.

Center hold down bar 17 also moves out simultaneously with the shear, and, as shown in Figures 13 and 14, is actuated by a cam 76 on shaft 46 for lifting a linkage 77 to advance a rod 78 connected with bar 17. A spring 79 in the linkage serves to hold the follower on cam 76. After bar 17 slides out sufficiently to deposit the wire in bending position the bar is lifted to clear the wire and then retracted. This lifting of the bar is accomplished by a curved strap 36 on rod 78 and adapted to ride up on an edge 82 of the frame when rod 78 goes out.

Magnets 23 are mounted on the frame in line to hold the wire in its laterally displaced bending position. These magnets also function to attract the wire from the cutting position and thus cooperate with the other wire moving elements when the wire is shifted over. See Figure 26.

*Bending mechanism.*—Upon movement of wire 19 into bending position the lower pivoted arms 26 swing up to engage the wire and bend up the sides of the loop. As shown in Figures 21 and 22, arms 26 are actuated by a cam 83 on shaft 46 for lifting a linkage 84 having racks 86 meshed with gears 87 on arm shafts 88. Springs 89 in linkage 84 serve to hold the follower on cam 83. Shafts 88 of bending arms 26 are journaled in blocks 91 fixed to rods 92 supported on cross rods 93 of the frame, and these blocks also have fixed thereon the corner elements 24 about which the wire is bent when arms 26 turn up.

At the time arms 26 move up, corner elements 24 are inclined inwardly as shown in Figure 23. During the final bending operation it will be recalled that these elements turn upright with a slight outward and downward motion to apply tension to the wire at the corners of the loop. This movement of corner elements 24 is effected by turning blocks 91 about the axes of rods 92, and is accomplished by means of a cam 94 on shaft 46 for lifting a linkage 96 adapted to turn rods 92. A spring 97 holds the follower of the linkage against the cam.

Figure 7:
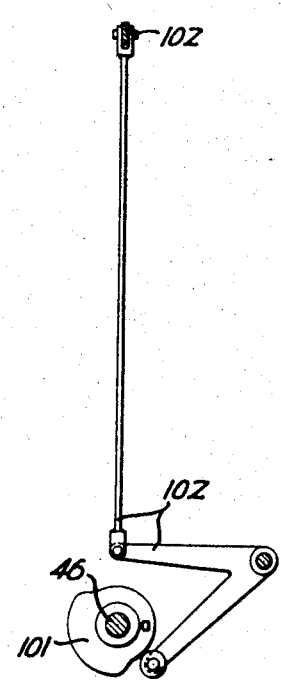
Figure 7 is a longitudinal sectional view taken in a plane indicated by line 7—7 of Figure 3, showing the cam and linkage for reciprocating the head which carries the upper bending arms.
Figure 8:
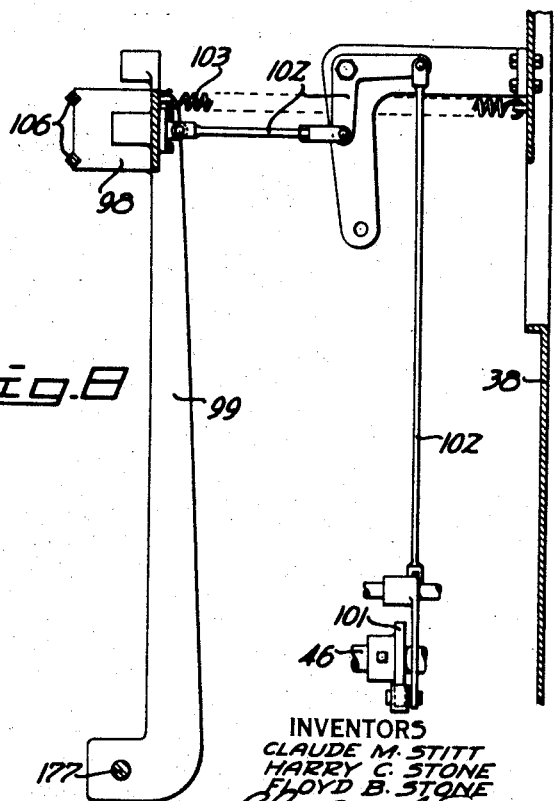
Figure 8 is a transverse sectional view of the same.

After arms 26 have bent up the wires to form the sides of the loop, a head 98 carrying the upper folding mechanism is moved out into the plane of the loop. As shown in Figures 7 and 8, head 98 is mounted on the upper end of a long arm 99 pivoted at the base of the machine. The head is moved in and out by a cam 101 on shaft 46 for lifting a linkage 102 connected to reciprocate the head. A spring 103 tends to pull the head back into retracted position.

Figure 15:
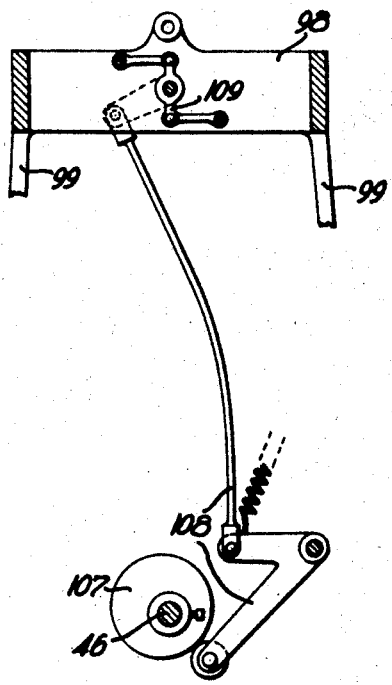
Figure 15 is a longitudinal sectional view taken in a plane indicated by line 15—15 of Figure 3, showing the cam and linkage for moving the head sections together at the time of welding.
Figures 16, 17:
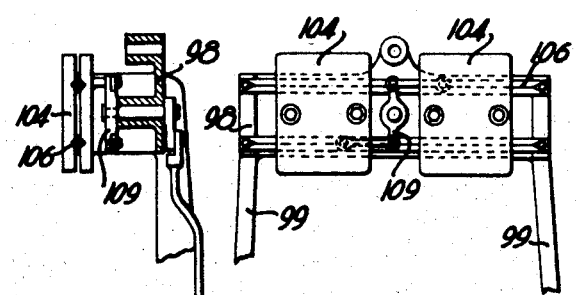
Figure 16 is a transverse sectional view of the same.
Figure 17 is a fragmentary front elevational view of the head blocks.
Figure 29:
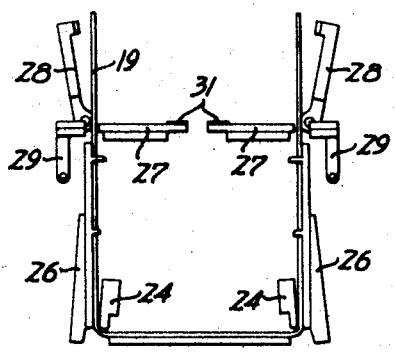

Head 98 has two movable sections 104 slidable toward and away from each other on rails 106. As shown in Figures 15, 16 and 17, movement of head sections 104 is controlled by a cam 107 on shaft 46 for lifting a linkage 108 to rotate a couple 109 connected with the head sections. These head sections are normally in extended position and are not brought together until the loop is ready for welding.

Figure 6:
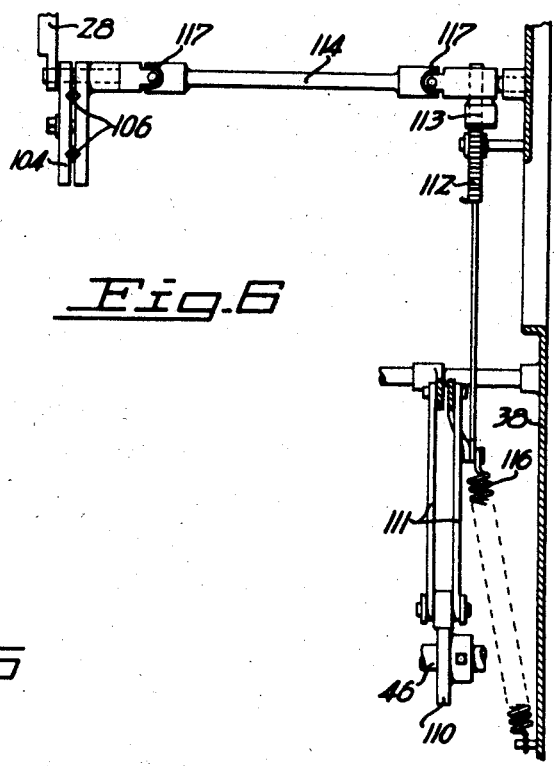
Figure 6 is a transverse sectional view of the same.

Upper bending arms 28 are pivotally mounted on head sections 104. As shown in Figures 5 and 6, these arms are controlled by a cam 110 on shaft 46 for lifting a linkage 111 having a pair of racks 112 meshed with segment gears 113 on arm shafts 114. Springs 116 serve to hold the linkage follower against the cam. In order to accommodate movements of the head and its sections, arm shafts 114 are provided with universal joints 117, and segment gears 113 are widened to allow axial movement of the shafts.

Pressure elements 29 are also pivotally mounted on head sections 104. As shown in Figures 18, 19 and 20, the elements are actuated by a cam 118 on shaft 46 for lifting a linkage 119 connected with element shafts 121 through a series of jointed links 122. A spring 123 holds the linkage follower against cam 118. Since elements 29 are to maintain pressure on the sides of the loop during the time that head sections 104 are moving together, cam 118 is designed to hold the elements against the loop during movement of the head sections.

Figure 2 shows the various bending elements prior to commencement of the bending operations. At this time the head 98 is retracted to give clearance for the wire when the sides of the loop are bent up; and arms 28 and elements 29 are extended to lie outside the wire when the head moves out. A guide bar 126 is preferably provided on the front of the machine above head 98 to lie in front of the upstanding ends of the wire when the sides of the loop are bent up. This bar prevents the wire from being pushed out when head 98 moves forward. Guide pieces 127 are also preferably arranged on the frame at the sides of the head to keep the up-coming wire clear of the elements on the head.

Figure 30:
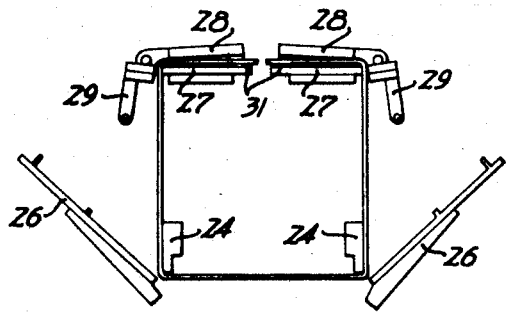
Figure 31:
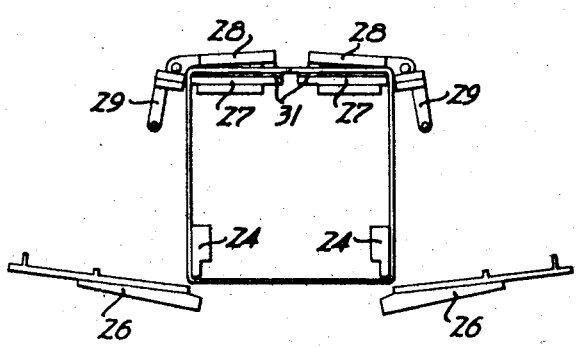
Figure 32:
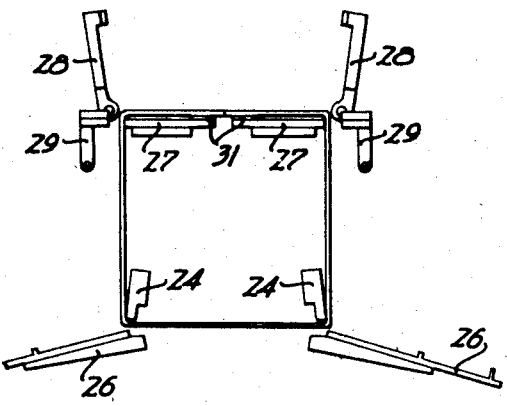
Figure 33:
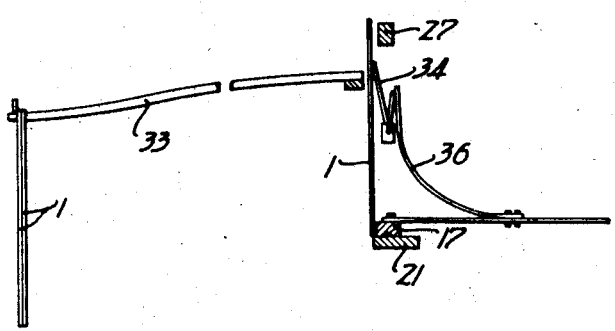

*Welding mechanism.*—As shown in Figures 30, 31 and 34, electrodes 31 are provided on plates 27 to engage the ends of the wire when the latter are brought down by arms 28. Current is supplied to these electrodes at the time the ends of the wire are moved into abutment to weld the wire in accordance with ordinary butt welding principles. A transformer 131 is provided for energizing the welding electrodes 31, and is preferably mounted adjacent the top of the frame as indicated by dotted lines in Figure 3.

Means are provided for controlling the welding operation. As illustrated in Figure 35, the control apparatus comprises a contactor 132 closed by a switch 133 (Figure 2) actuated in time with the operation of the machine by a cam lug 134 on gear 47. A time controlled circuit breaker 136 is provided for deenergizing the welding transformer after a predetermined interval regulated by dash pot 137. Figure 35 also shows a transformer 141 for exciting the various control units.

As seen in the wiring diagram of Figure 34, current is supplied to the welding circuit from lines 142 and 143. Primary 144 of welding transformer 131 is connected at one side to line 142, and secondary 146 is connected to electrodes 31 by leads 147. The other side of primary 144 is connected to the other line 143 by a lead 148, and an arm 149 of contactor 132 is interposed in this lead to open and close the primary circuit.

Contactor 132 is closed by a holding coil 151 upon closing of cam operated switch 133 which is interposed in lead 152 connecting one side of coil 151 with ground 153. The other side of holding coil 151 is connected in circuit with secondary 154 of energizing transformer 141 by lead 156; the opposite side of this secondary being grounded at 157, and the primary 158 being connected to lines 142 and 143 by leads 159. Closing of switch 133 is so timed that the welding transformer is energized when the ends of the wire loop are abutted. Once contactor 132 is closed it is so held by coil 151 by reason of a second arm 161 grounding the coil at 162. The operative connection between contactor arms 149 and 161 and coil 151 is indicated by dot and dash line 163.

Opening of contactor 132 to deenergize the welding transformer is effected by circuit breaker 136 having an arm 164 interposed in lead 156 to open the circuit to holding coil 151. Arm 164 is urged toward open position by a coil 165 in lead 148 that is energized as soon as contactor 132 is closed. A time delay is effected in this opening movement however by the retarding action of dash pot 137. Figure 35 shows the mechanical hook-up between arm 164 and the dash pot. The latter is designed to hold arm 164 closed for a predetermined interval sufficient to complete the welding operation. Adjustment device 166 provides means for regulating the time delay action. Dot and dash line 167 in Figure 34 indicates the operative connection between arm 164, coil 165 and dash pot 137.

An auxiliary switch 186 is also preferably provided in lead 156, by which the circuit is broken when arms 28 move to upright position, in event contactor 136 sticks in the closed position. Figures 3 and 5 show an extension 184 on linkage 111 for depressing a flexible contact strap of switch 186 away from contact 187 to break the welding control circuit. This auxiliary switch thus prevents electrodes 31 from arcing if for any reason contactor 136 fails to open.

Figure 34 also shows solenoid 54 interposed in lead 169 connected between the secondary of transformer 141 and contact stop 18. Incoming wire 4 is grounded to the machine at 171, thus completing the circuit through solenoid 54 when the end of the wire abuts stop 18, and thereby separating the feed rolls to cease forward movement of the wire.

*Adjustment.*—Means are provided for changing the size of loop formed by the machine. The lower folding arms 26 and corner pieces 24 are adjusted laterally by swinging the mounting blocks 91 in and out about the axis of rods 93. Shafts 92 of the mounting blocks 91 are supported by brackets 172 fixed on rods 93 so that when the latter are turned the blocks 91 are shifted. Turning of rods 93 is accomplished at the back of the machine by adjustment levers 173 as shown in Figure 4. Wing screws 174 serve to hold the levers in selected positions of adjustment.

The upper folding units are adjusted laterally and vertically by moving head 98 up and down. As pointed out in connection with the forward and back movement of head 98 (Figure 8), the head is mounted on arms 99 pivoted at the base of the machine on a rod 177. As seen in Figures 2 and 3 this rod is mounted on cranks 178, one of which is fastened to an adjusting lever 179 held in selected position by a wing screw 181. Thus, turning of lever 179 operates to raise or lower head 98. Lateral adjustment of the upper folding units occurs simultaneously with the up and down movement of the head by reason of couple linkage 109 (Figures 15 and 17) acting to contract or spread head sections 104. When the head is lowered the head sections move together, and when the head is raised the head sections are spread.

For smaller loops less wire is required and the shear head 13 is therefore adjustably mounted on the frame by a slotted plate 182. See Figure 2. Stop block 18 is also adjustably mounted by means of a slotted plate 183. These two adjustments serve to change the length of wire cut off, and both the shear head and stop are adjusted by equal amounts to keep the wire centered.

The form of bend at the corners of the loop may be altered by changing the shape of lower elements 24 and upper plates 27, about which parts of the wire are bent. Thus, for a sharp bend the parts would have right angle corners; or, if a round bend was desired the parts would be made with rounded corners. Beveled corners could likewise be provided, if desired.

We claim:

1. A wire handling machine comprising a pair of pivotally mounted arms for bending portions of a wire up from an intermediate portion to form sides of a loop, a second pair of pivotally mounted arms for bending the end portions of the wire inwardly to form another side of the loop, and means for fastening the ends of the wire together to close the loop.

2. A wire handling machine comprising means for bending portions of a wire from an intermediate portion to form sides of a loop, means for bending the end portions of the wire inwardly to form another side of the loop with the ends aligned for abutment, electrical means contacting the ends of the wire for welding the latter together upon abutment thereof, and means for applying pressure to sides of the loop for moving the ends of the wire into abutment.

3. A wire handling machine comprising means for feeding the wire into cutting position, means for cutting off a piece of wire of predetermined length, means for moving said piece into bending position, means for bending said piece into predetermined shape, means for fastening portions of the wire together, and means for discharging the wire from the bending position.

4. In combination, a wire handling machine, a reel for holding a supply roll of wire to be fed into the machine, resilient guide means engaging the wire intermediate said supply roll and the machine, and a guide arm pivotally mounted about the axis of said reel.

5. A wire handling machine comprising a pair of welding electrodes, a pair of pivotally mounted arms for bending ends of the wire into axial alignment and holding the same in contact with the electrodes, and means for moving an electrode and associated bending arm to abut the ends of the wire.

6. A wire handling machine comprising a welding electrode, an element for bending the wire into contact with the electrode, and means for simultaneously moving said electrode and element.

7. A wire handling machine comprising means for bending portions of a wire from an intermediate portion to form the sides of a loop, means for bending the end portions of the wire inwardly to form another side of the loop with the ends aligned for abutment, means for welding the latter together upon abutment, and means for moving the ends of the wire into abutment.

8. A wire handling machine comprising means for bending portions of a wire from an intermediate portion to form the sides of a loop, means for bending the end portions of the wire inwardly to form another side of the loop with the ends aligned for abutment, means for welding the latter together upon abutment, and means timed with the bending means for moving the ends of the wire into abutment.

9. A wire handling machine comprising means for bending portions of a wire from an intermediate portion to form the sides of a loop, means for bending the end portions of the wire inwardly to form another side of the loop with the ends aligned for abutment, means associated with the last mentioned bending means for welding the ends of the wire together upon abutment, and means for moving the ends of the wire into abutment.

10. A wire handling machine comprising elements about which a piece of the wire may be bent, means cooperating with said elements for bending portions of the wire to form sides of a loop, elements about which other portions of the wire may be bent, means cooperating with the second elements for bending the end portions of the wire inwardly to form another side of the loop, and means for welding the ends of the wire together to close the loop.

11. A wire handling machine comprising means for feeding the wire into cutting position, means for cutting off a piece of the wire, means for moving said wire piece into bending position, elements in the bending position about which the wire may be bent, means cooperating with said elements for bending portions of the wire to form sides of a loop, elements about which other portions of the wire may be bent, means cooperating with the second elements for bending the end portions of the wire inwardly to form another side of the loop, and means for welding the ends of the wire together to close the loop.

12. A wire handling machine comprising means for feeding the wire into cutting position, means for cutting off a piece of the wire, means for moving said wire piece into bending position, elements in the bending position about which the wire may be bent, means cooperating with said elements for bending portions of the wire to form sides of a loop, a head movable to an operative position adjacent the plane of the loop, elements on the head about which other portions of the wire may be bent, means cooperating with the second elements for bending the end portions of the wire inwardly to form another side of the loop, and means for welding the ends of the wire together to close the loop.

13. A wire handling machine comprising elements about which a piece of the wire may be bent, a pair of pivotally mounted arms cooperating with said elements for bending portions of the wire to form sides of a loop, elements about which other portions of the wire may be bent, a second pair of pivotally mounted arms cooperating with the second elements for bending the end portions of the wire inwardly to form another side of the loop, and means for welding the ends of the wire together to close the loop.

CLAUDE M. STITT.
HARRY C. STONE.
FLOYD B. STONE.